No. 620,990. Patented Mar. 14, 1899.
C. P. STEINMETZ.
FREQUENCY CHANGER.
(Application filed Jan. 30, 1895. Renewed Feb. 5, 1897.)
(No Model.)
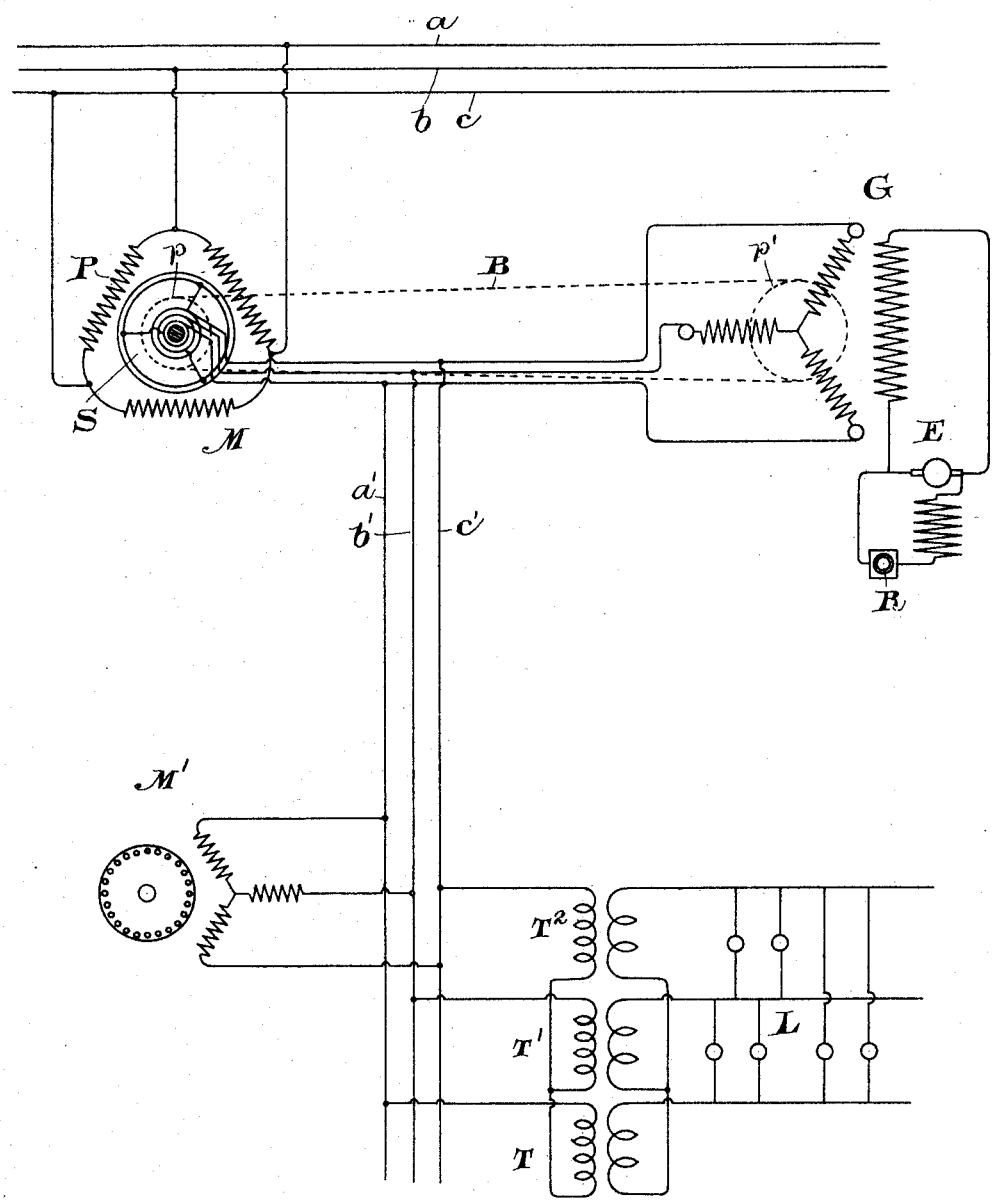
WITNESSES
A. F. Macdonald.
B. B. Hull.
INVENTOR
Charles P. Steinmetz
By Geo. R. Blodgett
Atty.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

FREQUENCY-CHANGER.

SPECIFICATION forming part of Letters Patent No. 620,990, dated March 14, 1899.

Application filed January 30, 1895. Renewed February 5, 1897. Serial No. 622,202. (No model.)

*To all whom it may concern:*

Be it known that I, CHARLES P. STEINMETZ, a subject of the Emperor of Germany, residing at Schenectady, county of Schenectady, State of New York, have invented certain new and useful Improvements in Frequency-Changers, of which the following is a specification.

The present invention relates to a certain novel arrangement for changing the frequency of alternating currents of one or a plurality of phases, the object being to take currents from any distributing system or branch of a system on which the currents have a given frequency and to efficiently convert these currents into other currents having a frequency different from that of the currents supplied.

This application is to be regarded as specific under my pending application, Serial No. 536,872, filed January 31, 1895.

A system of distribution is illustrated in the accompanying drawing, showing a typical embodiment of the invention, the system shown being a three-phase system, though, as above stated, the invention is equally applicable to currents of any other phase relation.

$a\ b\ c$ represent distributing-mains connected with a source of three-phase currents in any usual manner. An induction or transformer motor M has its primary coils P connected directly or through transformers with the distributing-mains. These coils are shown in the drawing connected in delta; but this of course is an immaterial matter, the Y connection of the coils being equally good. The secondary of the motor S is connected to collector rings and brushes, as indicated, and to a circuit $a'\ b'\ c'$, and it is also geared so as to run in unison with a second machine of the synchronous type G. This may be accomplished by mounting the rotating members of the two machines on the same shaft or by any desired form of intermediate gearing. A belt B is indicated in the drawing passing around pulleys $p\ p'$ on the armature-shafts of the machines. The synchronous machine G is a three-phase machine having coils connected in Y or delta and with their terminals coupled to the circuit $a'\ b'\ c'$ in multiple with the secondary of motor M. The field-circuit of the machine G is supplied with current from a direct-current exciter E, shown shunt-wound and provided with a rheostat R for regulating the exciter, and consequently the field strength of the main machine. The circuit $a'\ b'\ c'$ is shown supplying groups of lamps L through transformers T T' T². This, however, is merely to represent that the secondary circuit may feed translating devices of any desired description. In practical installations, where the frequency is reduced to a comparatively small number of cycles, the circuit $a'\ b'\ c'$ will be better adapted for operating motors, while the lamps, where lighting is to be done, would be supplied from the high-frequency mains $a\ b\ c$. An induction-motor M' of any ordinary or desired construction is shown having its primary coils connected to mains $a'\ b'\ c'$. With this arrangement the motor M will consume energy which is expended in driving the machine G as a generator, or, in other words, the machine G acts as a mechanical load or brake upon the induction-motor, maintaining the speed of rotation of the secondary member of the motor below that corresponding with the frequency of the primary currents. Hence, as is well known, the frequency of the currents induced in the secondary member of the motor will be equal to the difference between the frequency of the primary currents and the frequency with which the secondary circuit is rotated. Since generator G, however, is connected in multiple with the secondary of the motor, the mechanical energy expended in driving the generator is reconverted into electrical energy in the form of alternating currents having the same frequency as those induced in the secondary member of the motor and supplied to the same circuit. It will be seen that there is a transfer of mechanical energy from the motor M to the generator G along the belt B and that this energy appears as current of the lower frequency at the terminals of the generator G. Though I have shown this transfer of energy as taking place along a belt, it is evident that it could be accomplished in a variety of ways. Hence it will be understood that all the energy supplied to the motor (disregarding the losses in the machines themselves) is supplied to the secondary circuit $a'\ b'\ c'$ at the changed frequency. The number of poles of the generator G will of course be so proportioned to the speed at which it is to rotate that the frequency of the currents generated corresponds with the frequency of the induced currents in the secondary of the motor. Assuming, for example, that the gearing between the machines is such that both rotate at the same speed and that it is desired to reduce the frequency of the initial currents by one-half, then the motor would be rotated at one-half the speed corresponding with the initial frequency and the poles of the generator G would be such that when driven at a corresponding speed the generator also delivers to the circuit $a'\ b'\ c'$ currents of half the frequency maintained upon the system $a\ b\ c$. The motor M' would then receive currents of half-frequency and would tend to rotate at the same speed as motor M when geared to the generator G. The presence of the synchronizer not only reconverts the mechanical energy consumed by the motor M into electrical energy, but it also makes the system stable. Were the synchronizer or some other equivalent means not used for controlling the speed of the motor, it would be impracticable to maintain it at half-speed; but when coupled in multiple with the synchronizer, as explained, the induction-motor will run rigidly at half-frequency, for with increasing speed the frequency of the currents induced in the secondary of the motor would decrease, while the frequency of the currents generated by the generator would tend to increase. Hence the synchronizer will get into step at half-frequency and will control the speed.

The synchronous machine, while described as a generator, will not always work as such, but may occasionally work as a motor—as, for example, when no external energy is consumed in the low-frequency circuit.

I do not limit myself to the specific forms and connections shown and described, as it is evident that various changes may be made without departing from the scope of my invention; but

I claim as my invention and desire to secure by Letters Patent—

1. The combination of a transformer or induction motor, and a synchronous generator geared to run in unison therewith, with a source of alternating currents of given frequency supplied to the primary of the motor, and a circuit for supplying current to translating devices, connected in multiple with the generator-terminals, and with the secondary of the motor.

2. The combination of a transformer-motor, a synchronous dynamo-electric machine geared to run in unison with the motor, and reconverting the mechanical energy expended in driving the machine into the secondary circuit of the motor in the form of alternating currents of the same frequency as the currents induced in the secondary of the motor, and one or more induction-motors connected to the circuit leading from the synchronous machine and motor, as set forth.

3. The combination of an induction or transformer motor having its primary and secondary winding connected to circuits of different frequencies, a synchronous machine geared to and receiving power from the induction-motor and having its terminals connected to one of the first-named circuits, so as to return the energy to the electrical system expended in driving the synchronous machine.

In witness whereof I have hereunto set my hand this 28th day of January, 1895.

CHARLES P. STEINMETZ.

Witnesses:
B. B. HULL,
A. F. MACDONALD.